Sept. 27, 1932.    R. G. WHITLOCK    1,879,966
POSTAL MACHINE
Filed May 21, 1929    11 Sheets-Sheet 1

INVENTOR.
Ralph G. Whitlock
BY
Townsend, Loftus & Abbett.
ATTORNEYS.

Sept. 27, 1932.   R. G. WHITLOCK   1,879,966
POSTAL MACHINE
Filed May 21, 1929      11 Sheets-Sheet 2
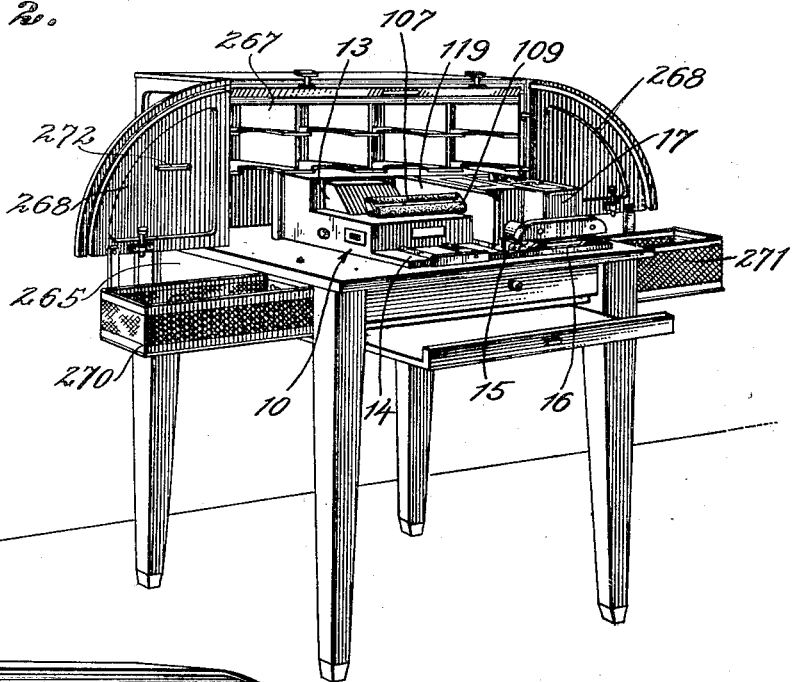
Fig. 2.
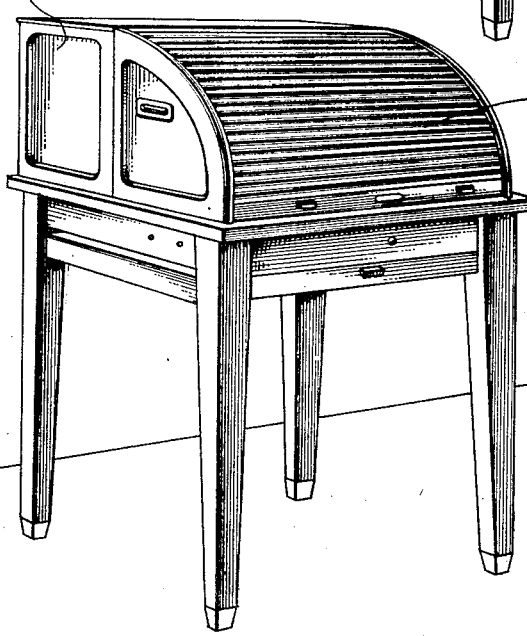
Fig. 2ª
INVENTOR.
Ralph G. Whitlock
BY
Townsend, Loftus & Abbett
ATTORNEYS.

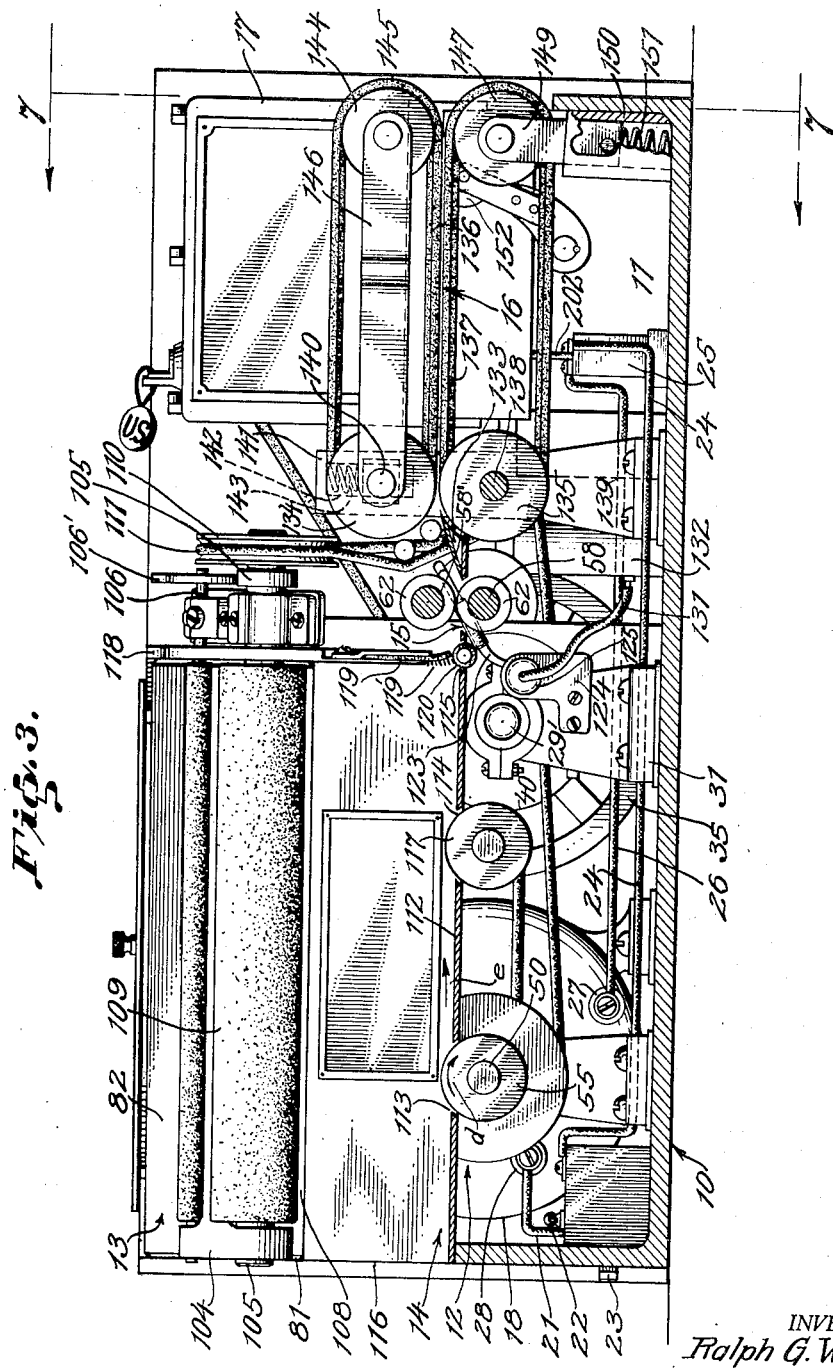

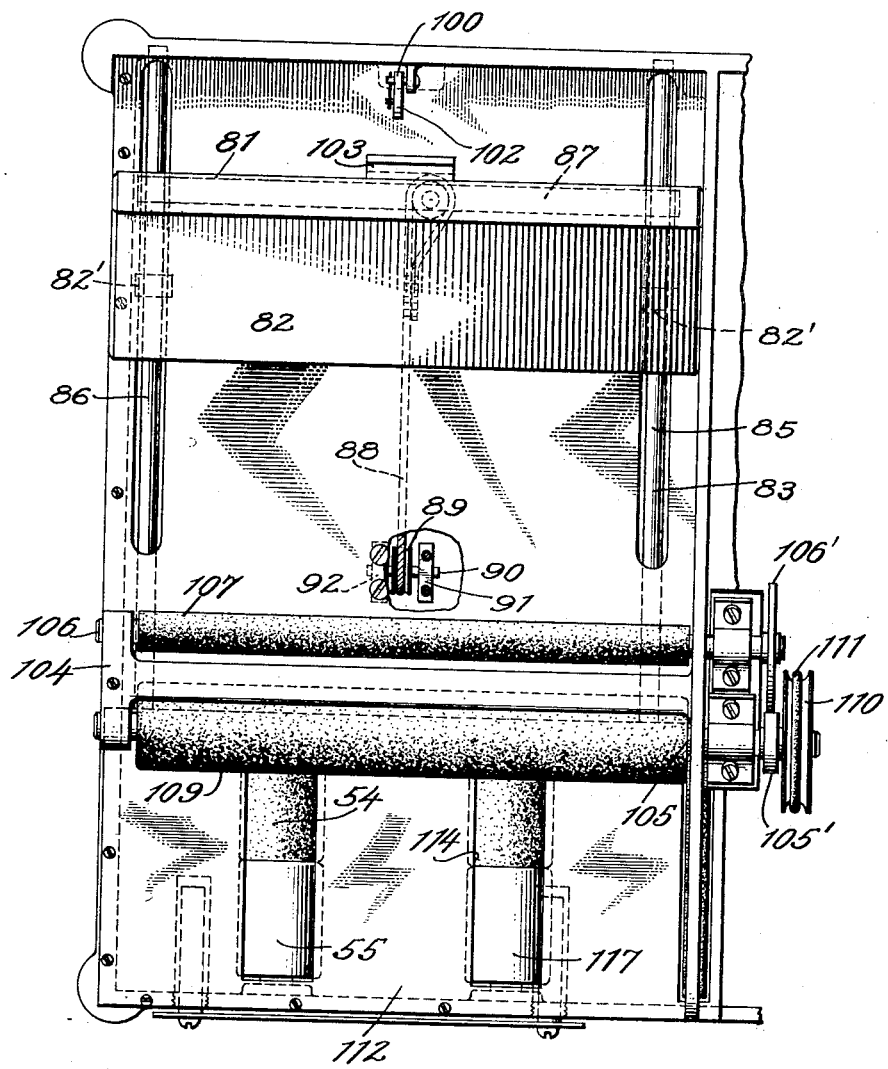

Sept. 27, 1932.  R. G. WHITLOCK  1,879,966
POSTAL MACHINE
Filed May 21, 1929   11 Sheets-Sheet 5
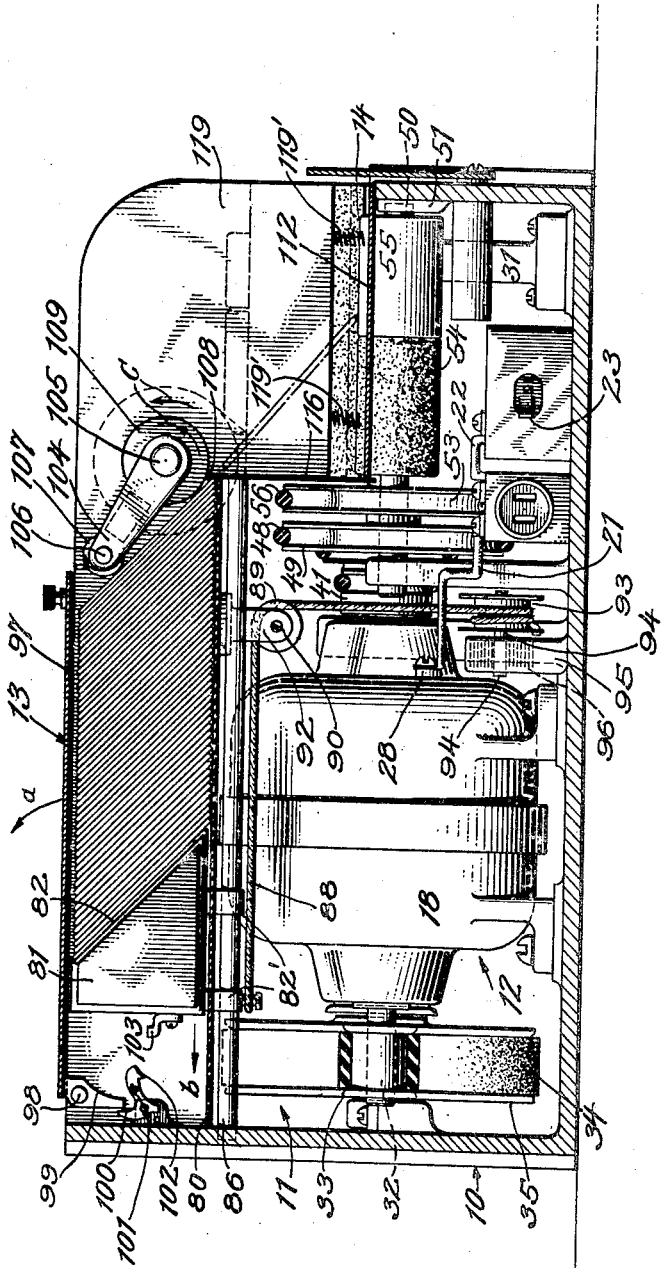
INVENTOR.
Ralph G. Whitlock
BY
Townsend, Loftus & Abbett.
ATTORNEYS.

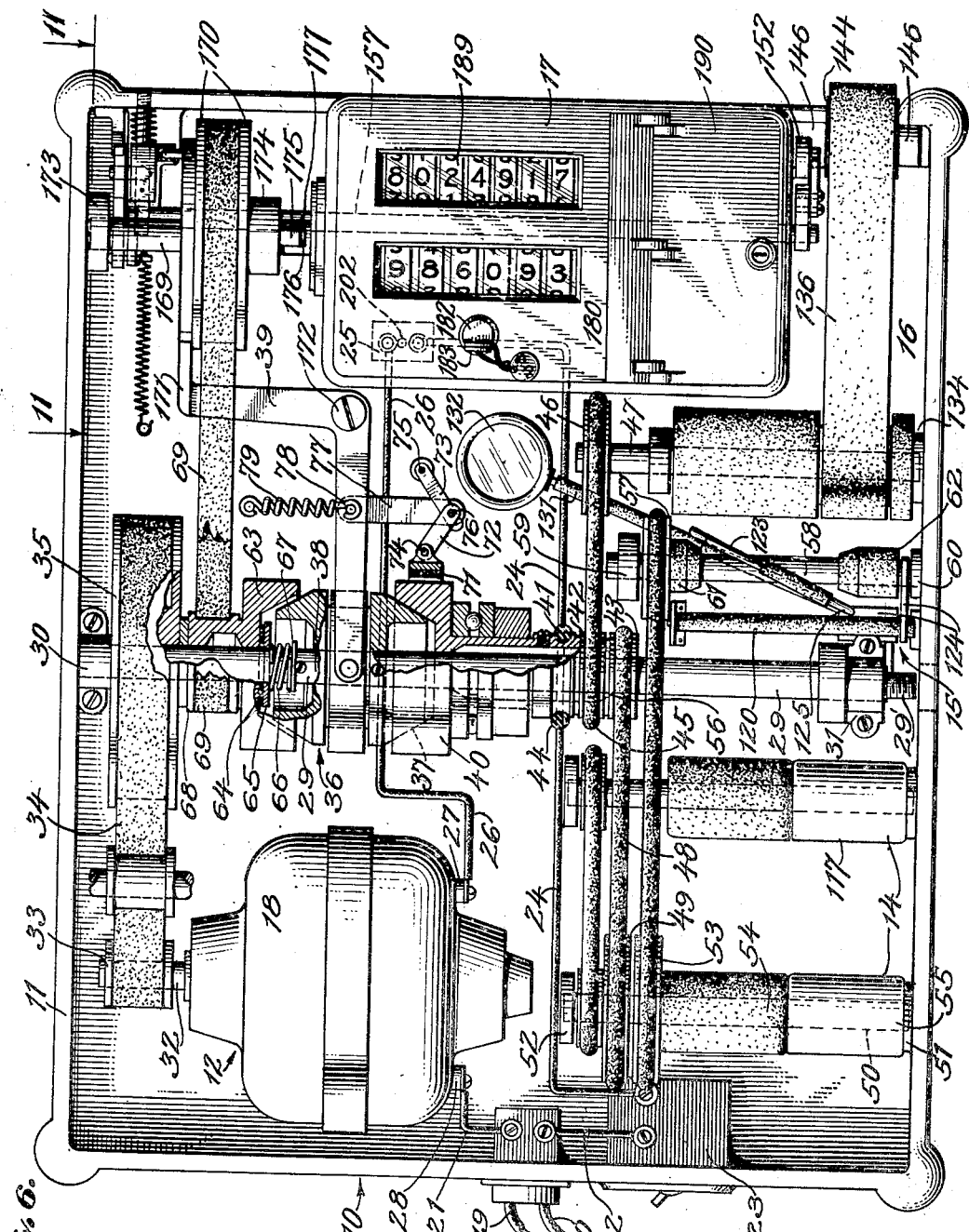

Sept. 27, 1932.　　　R. G. WHITLOCK　　　1,879,966
POSTAL MACHINE
Filed May 21, 1929　　11 Sheets-Sheet 7
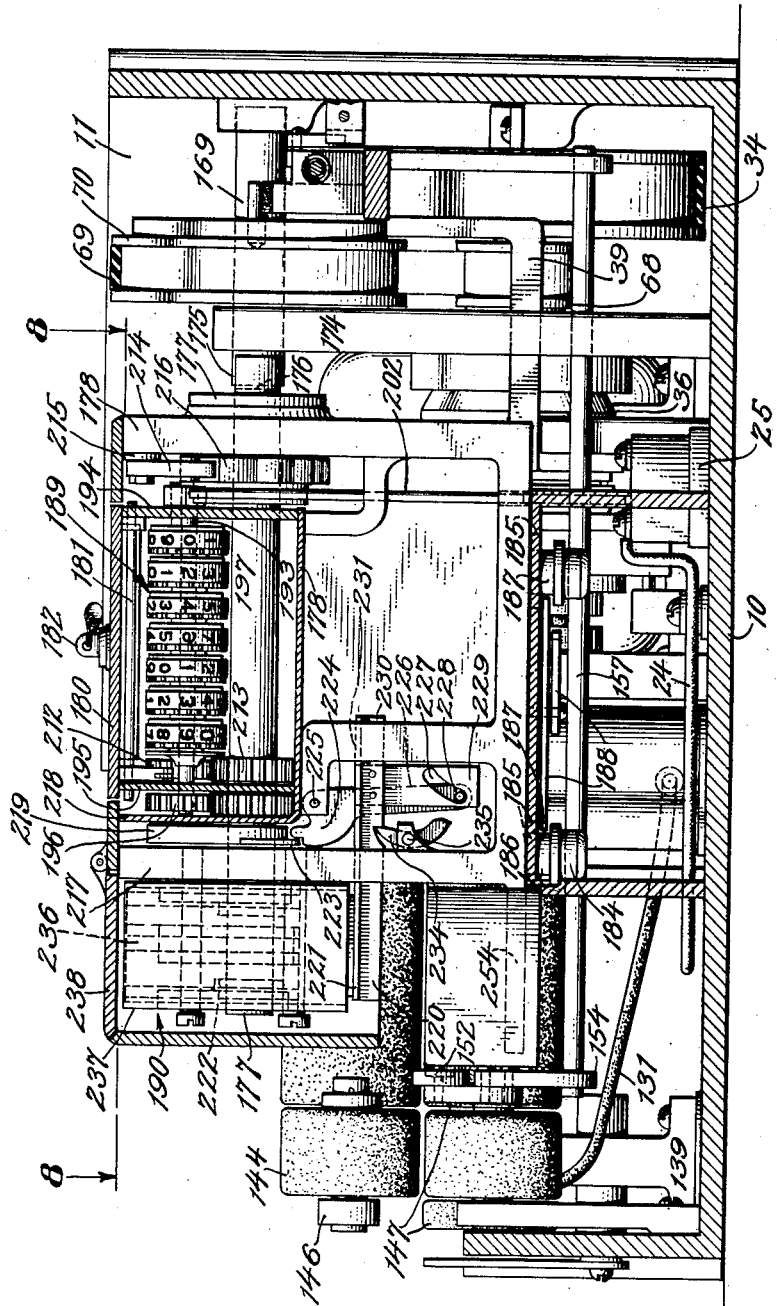
INVENTOR.
Ralph G. Whitlock
BY
Townsend, Loftus & Abbett
ATTORNEYS.

Sept. 27, 1932. R. G. WHITLOCK 1,879,966
POSTAL MACHINE
Filed May 21, 1929 11 Sheets-Sheet 8
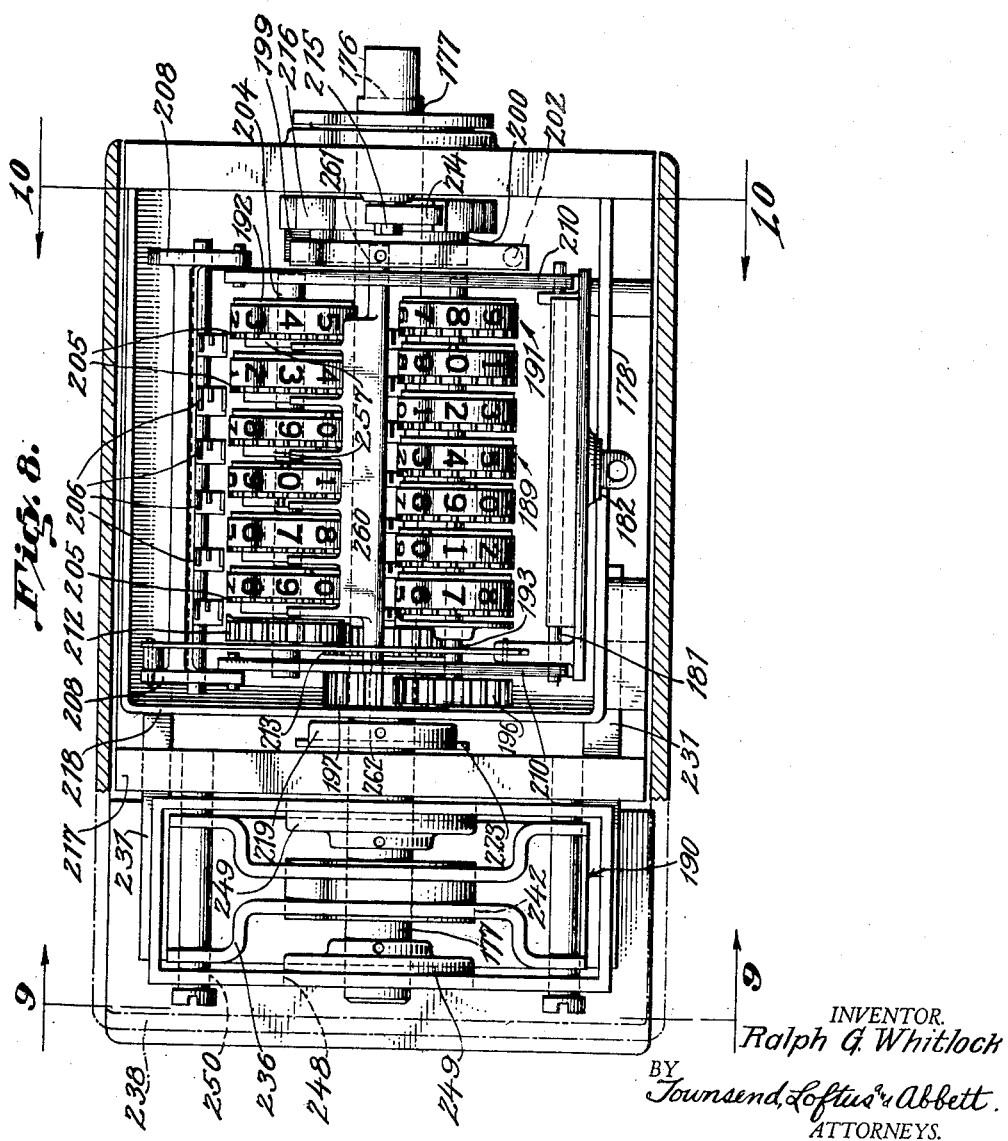
INVENTOR.
Ralph G. Whitlock
BY
Townsend, Loftus & Abbett.
ATTORNEYS.

Sept. 27, 1932.  R. G. WHITLOCK  1,879,966
POSTAL MACHINE
Filed May 21, 1929  11 Sheets-Sheet 9
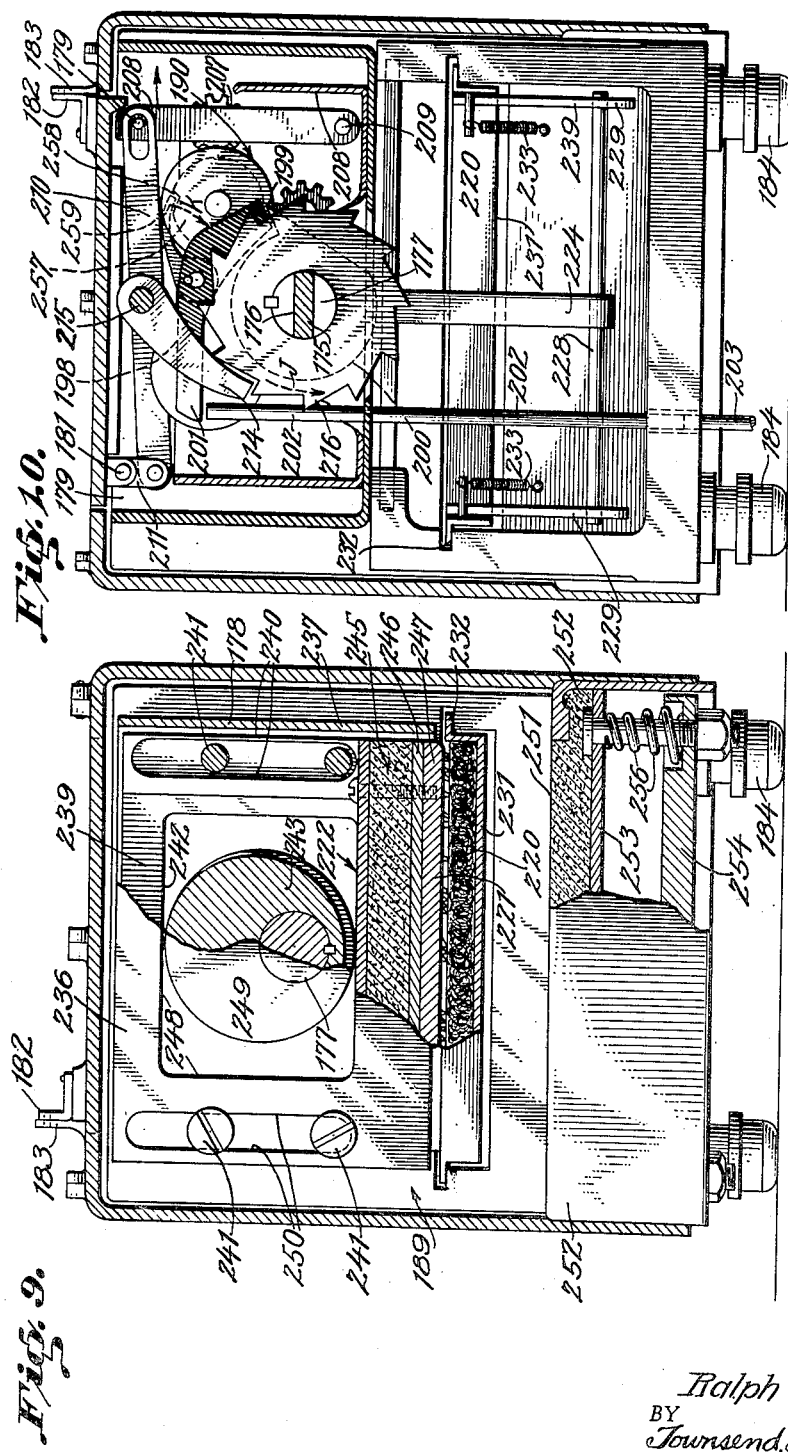
INVENTOR.
Ralph G. Whitlock.
BY Townsend, Loftus & Abbett
ATTORNEYS.

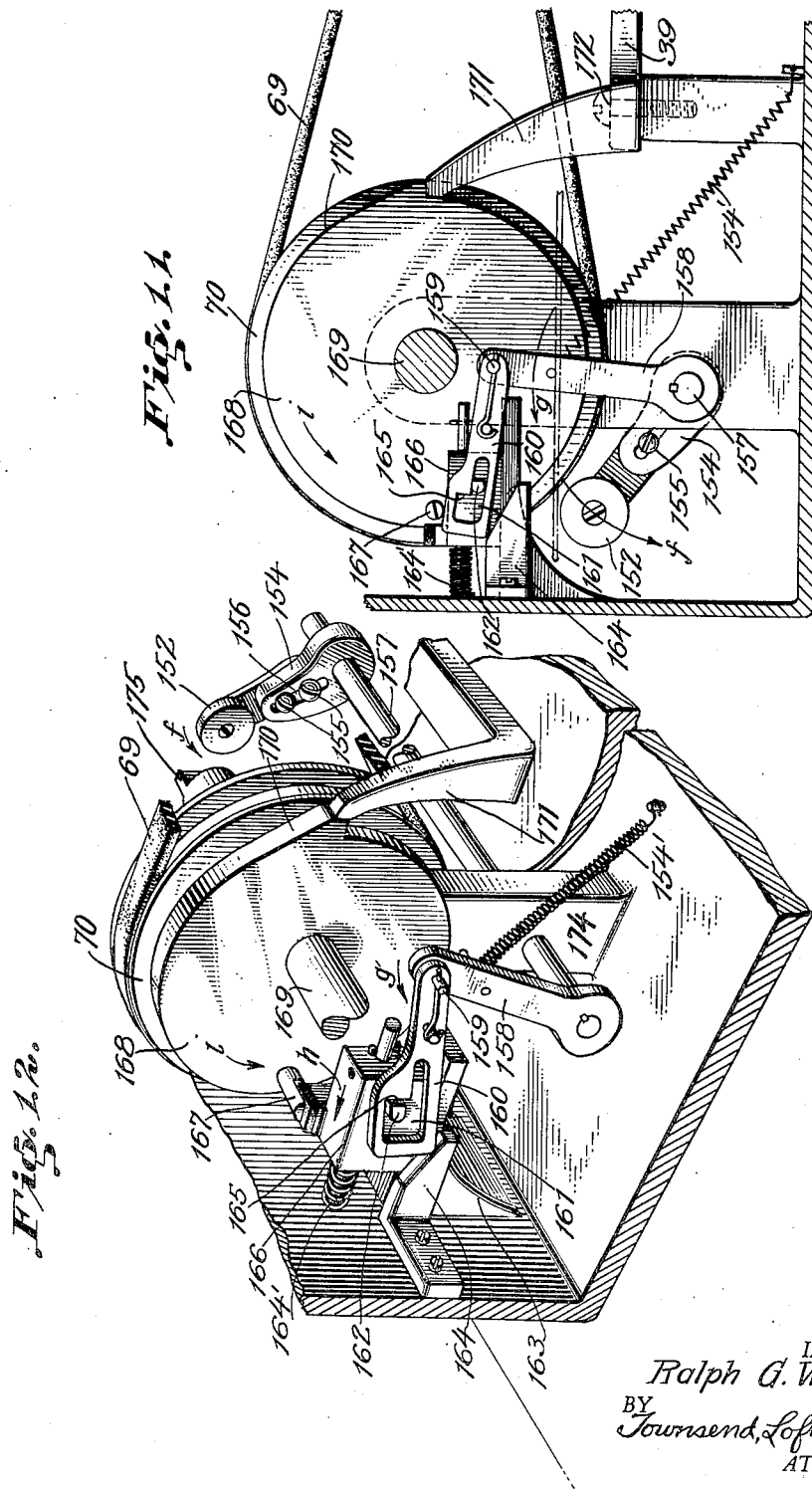

Sept. 27, 1932.   R. G. WHITLOCK   1,879,966
POSTAL MACHINE
Filed May 21, 1929    11 Sheets-Sheet 11

INVENTOR.
Ralph G. Whitlock
BY Townsend, Loftus & Abbett
ATTORNEYS.

Patented Sept. 27, 1932

1,879,966

UNITED STATES PATENT OFFICE

RALPH G. WHITLOCK, OF LOS ANGELES, CALIFORNIA, ASSIGNOR TO RALPH G. WHITLOCK PATENTS, INC., OF LAS VEGAS, NEVADA, A CORPORATION OF NEVADA

POSTAL MACHINE

Application filed May 21, 1929. Serial No. 364,828.

This invention relates to a postal machine and generally pertains to a machine for directly engrossing indicia upon a piece of mail matter as provided by section 452, postal laws and regulations, effective as of the date April 1, 1927, the printing unit of said machine being generally indicated in patents issued to me June 26, 1917 and April 17, 1928, and numbered 1,230,966 and 1,666,188, respectively, and a co-pending application filed by me June 30, 1925, S. N. 40,641.

At the present time it is possible under the provisions of the above-mentioned regulation to send mail without stamps affixed thereto by previous arrangement with the United States Post Office Department, and by directly impressing upon the pieces of mail matter certain indicia authorized by the government to be used in lieu of stamps. The printing of this indicia is accomplished by a printing press controlled by a meter previously set by a post office official, and which acts in a way to permit successive impressions to be made by the machine until a predetermined set number of impressions, as determined by the meter, have been exhausted, at which time the printing press will become automatically locked.

It is also desirable to incorporate in such a machine, means for automatically sealing mail matter at the time the indicia is impressed thereupon and thus materially decreasing the amount of manual labor required in preparing the mail for transmittal.

It is the principal object of the present invention to provide a postal printing machine having a removable printing press unit having an integrally formed meter, and which may be conveniently taken to a post office official for setting and may be readily interchanged with other units of different denominations without possibility of tampering, and provided with means whereby each printing operation of the printing press will be directly reflected upon the meters to insure that the printing mechanism may not be actuated in any manner to produce an unmetered permit impression.

The invention further embodies a novel envelope sealing means by which envelopes are moistened previous to and during the printing operation, and which incorporates trip operating means controlled by the successive pieces of mail matter passing through the machine to alternately produce actuation of the moistening and feeding mechanism and the printing mechanism.

The present invention contemplates the provision of a base structure supporting envelope feeding means by which envelopes may be successively fed to a moistener and through a sealing mechanism and thereafter automatically stopped in their travel while certain postal data is printed thereupon to be used in lieu of stamps, and after which the envelopes are successively discharged from the machine at a relative high rate of speed, so the envelopes will not interfere with each other.

The invention is more particularly described by way of example in the accompanying drawings, in which:

Fig. 2 is a view in perspective showing the machine interposed in a machine cabinet.

Fig. 2a is a view of the cabinet in its closed position.

Fig. 3 is a view in front elevation showing the present invention and particularly disclosing the relation of the food mechanism to the moistening and sealing mechanism.

Fig. 4 is a fragmentary view in plan particularly disclosing the envelope feed.

Fig. 5 is a view in end elevation showing the envelope feed and the method of delivering the envelopes successively onto the feed mechanism by which they are carried to the moistener.

Fig. 6 is a view in plan showing the general relation of the cancelling and printing machine to each other and particularly disclosing the power drive and control therefor.

Fig. 7 is a view in vertical section and elevation seen on the line 7—7 of Fig. 3, and particularly disclosing the relation of the printing mechanism to the feed rolls and the trip mechanism by which the operation of the envelope feed mechanism is interrupted and the printing mechanism is actuated.

Fig. 8 is a view in plan through the printing unit as seen on the line 8—8 of Fig. 7.

Fig. 9 is a view through the printing mechanism as seen on the line 9—9 of Fig. 8.

Fig. 10 is a view of the meter locking mechanism as seen on the line 10—10 of Fig. 8.

Fig. 11 is a fragmentary view of the trip mechanism as seen on the line 11—11 of Fig. 6, and as viewed in the direction of the arrows.

Fig. 12 is a view in perspective showing the trip mechanism.

Figure 1:
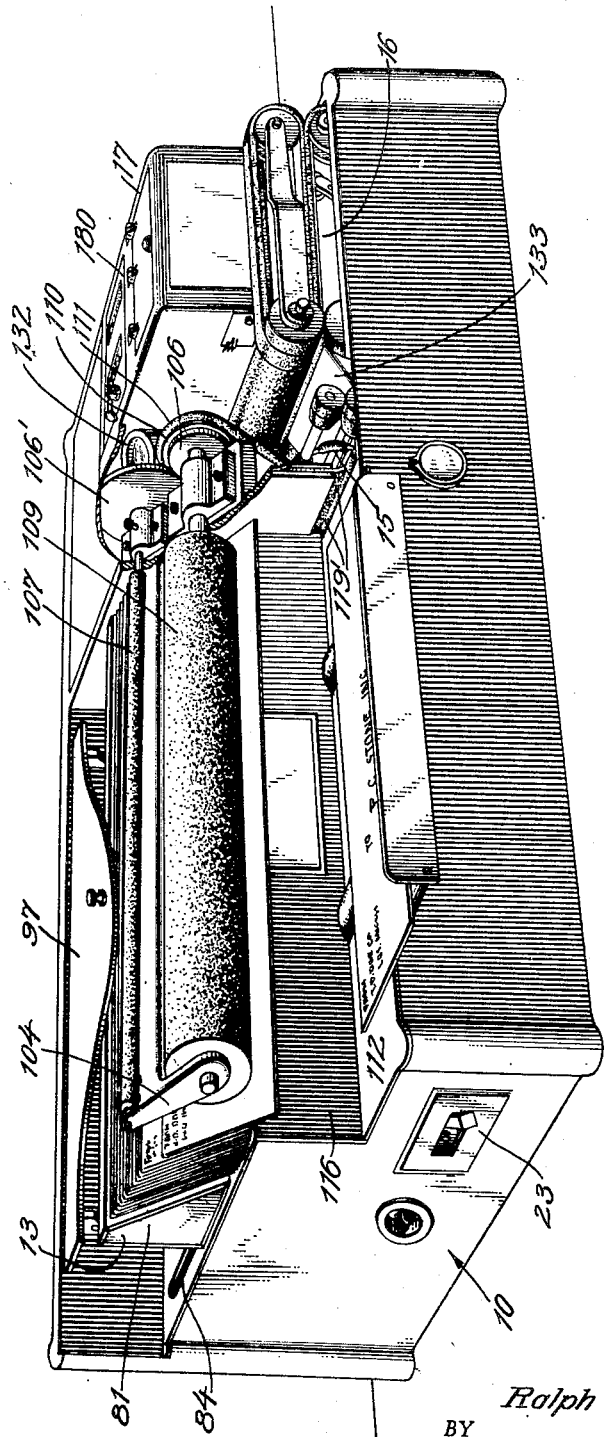
Fig. 1 is a view in perspective showing the structure with which the present invention is concerned.

Referring more particularly to the drawings, 10 indicates a base structure carrying a housing 11, within which a power organization is enclosed as generally indicated at 12 in Fig. 5. Mounted above the housing 11 is an envelope rack generally indicated at 13 in the drawings, by which envelopes are delivered to a feed structure generally indicated at 14 in the drawings. Envelopes are successively fed through a moistener unit indicated at 15 in the drawings, and then are delivered to a sealing structure indicated at 16 in the drawings; said structure carrying the envelopes successively to a meter press unit indicated at 17.

*Power organization*

The power organization 12, comprises a motor 18, suitably mounted upon the base 11 and receiving its electrical energy through lead wires 19 and 20. These wires are here shown as connected with a plug and with wires 21 and 22, respectively. The wire 2 leads to snap switch 23 which is connected with a conduit 24 leading to one pole of an automatic cutoff switch 25. The other pole of this switch connects with a motor lead 26 secured to pole 27 of the motor 18. The lead wire 21 directly connects with the motor pole 28. The cutoff switch 25 is designed to be closed when the meter press unit 17 is operatively disposed with relation to the mechanism and produces an open motor circuit when the meter press unit has been removed from the machine. The construction and operation of this switch will be described hereinafter.

The motor 18 is placed in driving relation with a jack shaft 29, here shown as being housed within bearings 30 and 31 carried on the base plate 10.

In Fig. 6 of the drawings it will be seen that the armature shaft 32 of the motor is fitted with a driving pulley 33 which acts through a belt 34 to rotate jack shaft pulley 35. It will be understood, however, that other transmission medium might be used if desired, or that the machine might be manually operated by a crank applied to the threaded end 29' of the jack shaft 29.

The pulley 35 is fixed to the jack shaft 29 and rotates therewith. Mounted upon this shaft and splined thereto is a double faced clutch cone 36. This structure comprises a cone 37 by which the envelope feed mechanism may be driven and a cone 38 by which the meter press unit is driven.

Reference to Fig. 6 will disclose the fact that the clutch unit 36 is alternately operated through a clutch arm 39 to alternately drive the envelope feed mechanism or the meter press unit. The cone 37 may mesh with and frictionally engage clutch drum 40, which is mounted to freely rotate upon jack shaft 29 and carries a series of driving pulleys 41, 42, and 43. The driving pulley 41 connects with a mechanism hereinafter described, by which envelopes are fed from the rack structure 13 through an endless belt 44.

The driving pulley 42 is provided with a belt 45 which is lead around a pulley 46 carried upon the shaft 47 of the sealing mechanism, generally indicated at 16, and which will be hereinafter described. The driving pulley 43 is provided with a belt 48 which leads around a pulley 49 mounted upon a roller shaft 50. This shaft is mounted in bearings 51 and 52 carried upon the base plate 10. The shaft also carries a pulley 53, a rubber faced roller 54, and a metal faced roller 55. A belt 56 is lead around the pulley 53 and also passes around a pulley 57 carried upon a slow speed drive shaft 58 mounted adjacent the moistener unit, generally indicated at 15. This shaft is mounted upon the bed plate 10 in bearings 59 and 60 and carries short rollers 61 and 62 upon and adjacent its opposite ends.

It will thus be evident that when the clutch cone 37 and the drum 40 are in mesh all of the mechanism driven from the pulleys 41, 42, and 43 will be operating in synchronism.

Clutch member 38 may be brought into mesh with a clutch drum 63 when the entire clutch unit 36 is shifted so as to cause disengagement of the cone 37 and the drum 40. The clutch drum 63 is constantly given a slight rotating impulse due to frictional engagement between a leather washer 64 carried by it and a metal washer 65 carried by the jack shaft 29. The flat faces of these two washers are held in intimate relation to each other by an expansion spring 66 interposed between the metal washer 65 and a collar 67 upon the shaft 29. This will cause a slight rotating impulse to be at all times imposed upon the clutch member 63 to insure instant response from the printing press driving mechanism, as will be hereinafter explained.

Clutch drum 63 is connected with a pulley 68 carrying a belt 69, which belt leads around a printing press driving pulley 70, the operation of which will be hereinafter explained.

In order to insure that the envelope driving mechanism will stop instantly when the printing press is in operation, a brake shoe, 71 is suitably mounted with relation to the outer circumference of the clutch drum 40 and may be operated by a pair of toggle levers 72 and 73. One end of the lever 72 being pivoted at 74 to the brake shoe and the other being pivoted at 75 to the base plate 10. The intermediate ends of the toggle levers are connected by a pivot 76 to an operating link 77 which is in turn pivoted upon pin 78 carried by the clutch lever 39. A tension spring 79 tends to normally move the clutch drum 40 and will concurrently actuate the toggle to set the brake 71.

*Envelope rack*

The envelope rack comprises a floor 80 which forms the ceiling of the housing 11. Mounted above said floor and adapted to move thereacross is an end block 81. This block has an inclined face 82 against which the envelopes lie in an inclined position so that their lower edges will be feathered. The block carries guide posts 82' which project downwardly through slots 83 and 84, in the floor 80, and slide along guide rods 85 and 86 which are disposed parallel to each other and in a plane beneath and parallel to the floor 80. The rearmost posts 82 are connected by a cross bar 87. A tension cable 88 is secured centrally of said bar and extends forwardly beneath the floor 80 to pass over a pulley 89 carried upon a shaft 90 mounted within bearings 91 and 92. The cable 88 is then lead downwardly and is wound around a drum 93 carried upon a shaft 94. This shaft is rotatably mounted within a bearing 95 and is connected with a spiral spring 96 which circumscribes the shaft and causes it to unwind against the tension of the spring. In order that the envelopes shall not be forced upwardly and out of their arranged position a cover 97 is provided and is pivotally mounted upon a pin 98 at one end thereof. Associated with the cover adjacent the pin 98 and normally extending downwardly therefrom when the cover is in its normal position, is a finger 99 which engages a pawl 100 mounted upon a pivoted pin 101. This pawl carries fastener 102 which engages a lug 103 on the back of the end block 82 and will hold the block against the action of the cable 88 and the spring 96 when the cover is in its raised position, but will release the block when the cover has been folded downwardly, thus insuring that the block will not violently move during the closing operation to disturb the arrangement of the stack of envelopes placed within the rack 13.

The envelopes are held in the rack in an inclined feeding position by pressure arms 104 freely mounted upon a shaft 105. At the free ends of said arms, a shaft 106 is carried and supports a pressure roller 107, adapted to normally exert pressure by gravity or spring tension against the foremost inclined envelope in the rack, and to insure that this envelope will be projected downwardly and outwardly from the rack through a throat 108 as feed roller 109 is rotated. This roller is carried by the shaft 105 and is driven by pulley 110 through a belt 111. The shafts 105 and 106 are fitted with friction wheels 105' and 106' which are in contact and cause the roller 107 to rotate in a reverse direction to roller 109 to cause roller 107 to resist the downward pull of roller 109 upon the envelope directly beneath the one being discharged from the rack.

*Envelope feed*

Disposed at right angles to the floor 80 of the envelope rack structure 13 is an envelope feed floor 112, having openings 113, 114 and 115 therethrough. These openings occur at intervals throughout the length of the feed floor 112. The opening 113 accommodates the rubber roller 54 and the metal roller 55 which are mounted upon and rotate with a shaft 50. These rollers are of equal diameter and are placed end to end on the shaft with contiguous faces abutting. The rollers are so mounted and are of a diameter to insure that a sector of the rollers will project above the feed floor 112 at all times.

By referring to Fig. 5 of the drawings, it will be seen that the rollers are substantially the same length and that the rubber roller is adjacent the vertical wall 116 which projects downwardly from beneath the projecting roller 109 at the throat 108.

A roller 117 is rotatably mounted parallel to the shaft 50 and projects upwardly through the opening 114 in the feed floor 112. This roller is disposed transversely of the path of travel of an envelope through the envelope feed unit 14. The rollers 54 and 55 rotate at a relatively slow speed, while the roller 117 rotates at a slightly increased speed. At the end of the feed floor 112 is disposed an end wall 118 carrying a vertically yieldable sheet rubber gate 119, and spring fingers 119' which force the envelope against a roller of relatively small diameter 120, mounted within the openings 115 in the feed floor 112 and further acting to prevent other than the lowermost envelope from crowding through the machine. The roller 120 operates at a relatively high speed and frictionally engages the bottom of the piece of mail matter to force it through the openings controlled by the gate 119 and finger 119'. This roller also tends to lift the forward end of the envelope and to cause it to enter the throat between feed rollers 61 and 62 which are mounted upon parallel shafts 58 and 58', respectively.

Moistening unit

The moistening unit 15 is stationed between the end of the feed floor 112 and the throat of the sealing and conveying mechanism 16, which will be hereinafter described.

The moistener unit 15 comprises an inclined moistener tube 123. This tube inclines both vertically and horizontally from a supporting fitting 124 disposed adjacent the outer edge of the feed floor 112, and near the gate 119. The fitting 124 carries a universal joint 125 by which the moistener tube may be manipulated to assume a desired inclination in any plane, and to extend across and beneath the path of travel of the unsealed envelopes.

Figure 13:
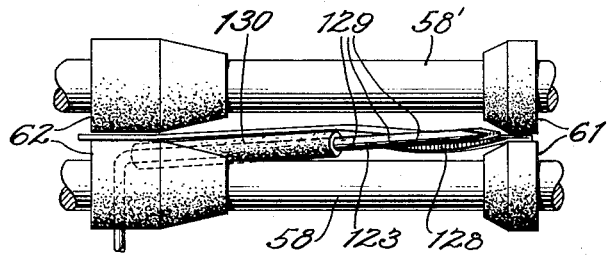
Fig. 13 is a view in end elevation showing the operative relation of the moistener to an envelope prior to the entry of the moistener tube between the envelope body and flap.
Figure 14:
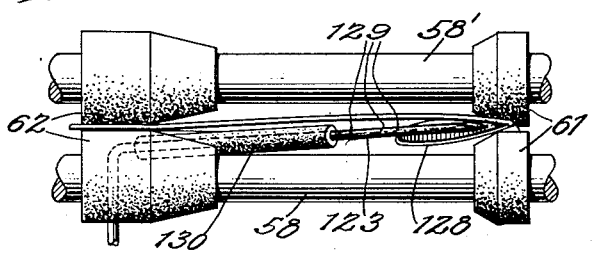
Fig. 14 is a view in end elevation showing the position of the moistener tube with relation to the envelope flap during the moistening operation.

As shown in Fig. 13 of the drawings, it will be seen that the free end of the moistener tube, as indicated at 127, is tapered and extends forwardly and away from the approaching envelope. It is also disposed beneath the path of travel of the envelope so that the envelope will rest upon the moistener tube and will be supported in a manner to permit the flap 128 of envelope 129 to swing downwardly and thus permitting the moistener tube to pass along and between the flap and the body of the envelope, as particularly shown in the Figs. 13 to 16, inclusive. The tube of the moistener is of small diameter to reduce the size of the column of water conveyed by it and thereby eliminating the necessity of wicks or packing as required in moisteners of large diameter. The moistener tube is formed with a plurality of small perforations 129 which extend through the under wall of the moistener tube. A sliding sleeve 130 is mounted upon the tube and may be moved longitudinally thereof to seal a desired length of the tube and to prevent the envelope flap from being moistened except over a predetermined area. The water will be applied directly to the envelope flap.

Figure 15:
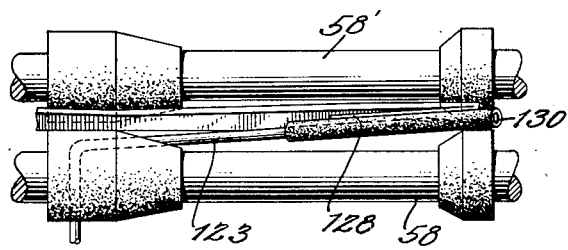
Fig. 15 is a view in end elevation showing the moistening tube when in a non-sealing position.
Figure 16:
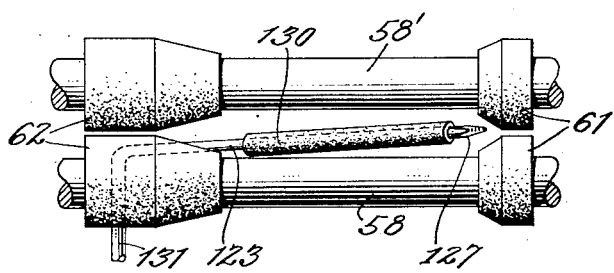
Fig. 16 is a view in end elevation showing the moistening tube covered as would be the case when not in use.

By reference to Fig. 15 of the drawings it will be seen that the moistener may be rendered completely inoperative by moving the sleeve 130 to a non-sealing position, preventing the tube from entering between the envelope and its flap.

Water for the moistener tube is delivered to the fitting 124 through a pipe 131 communicating with a suitable gravity feed water reservoir 132. The openings 129 in the moistener tube are of such a restricted diameter as to insure that the head of water within the reservoir will not force the water from the openings, but that only when the surface of the envelope flap brushes across the openings the water will be applied by capillary attraction. Attention is directed to the fact that the envelopes are lifted as they pass the moistener, thus acting to hold the flap against the moistener tube 127.

Sealing and conveying mechanism

The sealing and conveying mechanism generally indicated at 16 in the drawings, comprises an inclined floor 133 onto which an envelope is delivered as it is fed forwardly by the rollers 61 and 62. This inclined floor directs the envelope into a throat formed by the rollers 134 and 135 and conveyor belts 136 and 137. The lower roller 135 is mounted upon a shaft 138 carried in a permanent bearing 139 mounted upon the base 10. A complementary upper roller 134 is mounted upon a floating shaft 140, carried in a vertically moving bearing box 141 mounted in sliding ways 142, thus permitting the upper roller to have vertical or reverse movement with relation to the lower roller.

A helical compression spring 143 holds the rollers 134 and 135, and the conveyors 136 and 137 in yieldable contact with each other. The endless conveyor 136 passes around a pulley 144 mounted upon a shaft 145. This shaft is mounted in suitable bearings 146. The lower conveyor belt 137 passes around a pulley 147 mounted upon a shaft 148. The shaft 148 is carried by a vertically floating bearing 149 slidably mounted within a guide tube 150. This guide tube is inclined to the vertical and carries expansion spring 151 therein which bears against the lower end of the floating bearing member 149 and tends to force the pulley 147 upwardly and outwardly in a manner to maintain pressure against the conveyor belt 136, and to maintain tension upon the conveyor belt 137.

By reference to Fig. 5 of the drawings, it will be seen that an envelope of normal size, when fed between the rollers 134 and 135 and the belts 136 and 137, will be simultaneously engaged by the rollers and the belts, since the rollers extend for a part of the width of an envelope and the belts extend for a part of the remaining width of the envelope, while the outside diameter of the rollers and the effective diameter of the belts at the point of contact will be the same. The rollers are made of material, such as rubber and will act to compress the moistened flap of the envelope and the body of the envelope to seal the same. The remaining portion of the envelope will be engaged between the rubber belts, and the envelope will then be fed forwardly and horizontally by frictional engagement of the conveyor belts.

Power trip mechanism

The rubber conveyor belts 136 and 137 frictionally hold the sealed envelope and guides it to a printing station adjacent the meter press unit 17. It is understood, however, that the meter press is normally inactive while the envelope is being fed from the stack to the moistener station and from there through the sealing mechanism to the press. The presence of an envelope delivered to the press for printing is designed to actuate mechanism by which driving connection may be established between the meter press and the jack shaft. This mechanism is more particularly illustrated in Figs. 6, 11 and 12 of the drawings, where it will be seen that a trip roller 152 is disposed in the path of travel of the envelope as the envelope reaches its final printing position, while carried by the conveyor belts 136 and 137.

The roller 152 is mounted upon an arm 153 which is supported for longitudinal adjustment upon a trigger arm 154 by screws 155 which extend through a slotted opening 156 in the fork. The trigger arm is carried upon a horizontally extending trip shaft 157 which extends transversely of the entire machine and beneath the meter press unit 17. The trigger arm 154 is designed to normally support a sector of the roller 152 above the plane of travel of the envelope and to permit the roller to swing downwardly below the plane of travel of the piece of mail. The swinging movement acts to initiate driving operation of the meter press 17 through a cam and trip structure particularly shown in Fig. 12 of the drawings. Here it will be seen that a radius arm 158 is keyed on the opposite end of the trip shaft 157 and that same arm extends substantially vertically from the shaft.

Pivotally connected to the upper end of the radius arm by a pin 159 is a shuttle 160. This shuttle has a key slot 161 therein. The major length of the slot extends longitudinally of the shuttle and terminates at the outer end of the shuttle in an upper recess, normally accommodating a lock pin 162. The lower corner of the shuttle as indicated at 163 rests upon and rides along the inclined face of a wedge block 164 so designed as to cause the free end of the shuttle to raise as it moves toward the wedge block and to permit the lock pin 162 to clear the shoulder 165 of the key slot 161, thus permitting the shuttle to move longitudinally without restriction and releasing the pin 162. The pin 162 projects outwardly from the side of a shuttle block 166 which normally stands in an obstructing position beneath cam pin 167 projecting from the face of a cam 168. This cam is mounted on a shaft 169 and rotates therewith.

The circumferential edge of the cam is formed with a swell 170 which actuates the clutch trip finger 171 pivotally mounted upon a pivot 172 and carried as a part of a bell crank clutch arm 39. The trip finger 171 is held in constant contact with the edge of the cam 168 by the spring 79. The contour of the cam is such as to normally hold the clutch cone 37 in frictional engagement with the drum 40, at which time the trip finger 171 will be engaged by the swell 170 on the cam 168. When the cam rotates, the end of the finger will abruptly drop from the swell and the spring 79 will tend to throw the cone 38 in mesh with the drum 63. This will cause a driving connection to be established by the pulleys 68 and 70 through the belts 69. The pulley 70 is designed to drive the meter press units 117.

Meter press unit

The pulley 70 is mounted on a shaft 169 supported in suitable bearings 173 and 174. The shaft is formed at its driving end with a transverse tongue 175 adapted to mesh with a transverse groove 176 in the end of the printing press shaft 177. This form of coupling makes it possible for the printing press unit to be instantly disconnected from the shaft 172 and to permit the printing press to be bodily removed without disturbing the moistening and sealing mechanism which may continue to function independent of the printing press.

The printing press shaft 177 extends horizontally and is suitably housed in bearings at the opposite ends of the meter housing 178. This housing is in the form of a rectangular box, having an opening 179 in the top thereof, normally closed by a lid 180, which is mounted upon a hinge pin 181 within the box, and adjacent one end of the opening. The lock lug 182 is fastened to the upper face of the lid adjacent its free end and registers with a complimentary lock lug 183 when the lid is closed, to receive a lid seal adapted to be applied and sealed by the postal authorities at the time the meter is set.

Legs 184 are provided on the bottom of the box and extend downwardly through openings 185 in a housing floor plate 186. These legs are formed with circumferential grooves 187 adapted to receive a latch member 188 which locks the legs with relation to the base structure of the machine, and detachably secures the meter box in position, permitting it to be removed when it is to be interchanged with printing presses of other denominations or is to be taken to the Post Office Department for the setting of the meter. The meter is a part of, and formed integrally with the printing press, and is normally inaccessible and not easily removed.

The printing press unit 17 consists of a meter unit 189, and a printing unit 190. The meter unit comprises two sets of counter-dials, 191 and 192. The set of dials 191 are accumulative in their action and register the collective number of printing operations. The set of dials 192 act by diminution to subtract one unit for each actuation of the meter press, and are so designed as to be set for a pre-determined number of printing operations so that this sum may be eventually exhausted during the continued operation of the machine.

The general construction whereby the dials 191 accumulate, and the dials 192 act by diminution is of general construction and is not part of the present invention, except in combination with the transfer wheels 205 and 206, by which the dials are set. Mechanism for accomplishing this result is disclosed in my co-pending U. S. application for Letters Patent, S. N. 326,846, filed Dec. 18, 1928, and entitled "Manual reset meter".

The dials 191 are mounted upon a shaft 193 which extends through a bearing plate 194 at one end, and a bearing plate 195 at the opposite end. A gear 196 is secured upon the end of the shaft extending through plate 195, and is in mesh with a gear 197 keyed upon the printing press shaft 177, and by which it is driven. The opposite end of the shaft 193 carries a pawl 198 adapted to register with a ratchet tooth 199 formed as a part of a ratchet wheel 200, carried upon printing press shaft 177. The opposite end of this pawl has a horizontal extension 201 adapted to engage a switch push rod 202 which extends downwardly through the floor of the meter box and actuates a switch 203 for a purpose to be hereinafter described.

The subtracting dials of the diminution structure 192 are mounted on a shaft 204. These dials are each provided with a gear 205 which may be brought to mesh with pinions 206 carried upon a shaft 207. The shaft 207 extends parallel to the shaft 204 and is mounted upon a rocker arm 208 to pivot horizontally from a pin 209. The upper end of this arm is pivoted to a pitman rod 210, which in turn is secured to a lever extension 211 of the hinge structure of the meter box lid 180.

By reference to Fig. 10 of the drawings it will be seen that when the lid is raised, the arm 208 will be rocked to move all of the pinions 206 out of mesh with the gears 205. This makes it possible to independently manipulate the dials 192 to set these dials at a desired number which will represent the number of impressions of the printing press authorized by the Postal Department.

The various pinions may be brought to mesh with the set dials when the cover 180 is closed. The shaft 204 is driven by a gear 212 secured at one end thereof and in mesh with a gear 213, secured upon the printing press drive shaft 177. In order to prevent rotation of the printing press drive shaft while the cover 180 is lifted, a non-reversing pawl 214 is mounted upon a pivot 215 disposed midway the length of the pitman rod 210 and carried thereby. This pawl is adapted to engage teeth of a ratchet wheel 216 keyed to the printing press drive shaft 177.

As clearly shown in the drawings, the counter-units are completely enclosed by a meter housing and there is no possibility to tamper with the units after the counter-compartment has been closed and sealed.

Mounted upon the printing press drive shaft 177 at a point intermediate end wall 217 of the meter box and a partition wall 218, is disposed a master printing cam 219. This cam acts to lock or release the ink pad 220 from a covering or obstructing position where it is held against the face of the type or printing plate 221. The cam 219 also moves the ink pad 220 from its obstructing position and permits the downward travel of the printing head 222. The master cam 219 is eccentric in shape and is formed with a flange 223. The periphery of the cam is in contact with a finger 224, while the face of the flange 223 is in contact with the back of the finger 224. The finger 224 is mounted upon a pivot 225 and has a downwardly extending oscillating arm 226 carrying a pin 228 which rides on a longitudinal slot 227 in a power arm 229 which extends downwardly from and is secured to a shank 230 of an ink pad frame 231. The frame 231, as clearly shown in Figs. 9, and 10 of the drawings, is formed with marginal flanges 232 along opposite edges thereof, which flanges support the frame and the pad at certain points in the reciprocating movement of the pad.

A spring 233 normally holds the printing frame in its outermost position in register with the type or printing plate and completely covers and surrounds the same as the edges of the frame extend slightly above the lower face of the ink pad. The pad is movable from beneath the printing plate only upon a full normal metered operation of the press. A rock pawl 234 is mounted upon a pivot 235 and is disposed in the path of travel of the shank 230 so that the pad will have an oscillating movement as it reciprocates to dip downwardly and then upwardly, as it moves to register with the printing plate.

In my Patent No. 1,230,966, issued to me June 26, 1927, a guard box was provided to enclose and guard the printing plate so that unauthorized and unmetered impressions could not be made. In the present case the ink pad and its frame serve the double function of guarding the type and inking them, and the pad frame is formed with a circumscribing flange into which a type plate normally seats while borne against by the pad, thus providing a circumscribing guarding flange.

Due to the construction of the cam 219 and its relation to the finger 224 it is impossible to force the printing plate inwardly or to wedge it downwardly, thus insuring the greatest security in the machine and complete accuracy of the meter.

The printing structure comprises a vertically reciprocating head 236 mounted within a sleeve 237, all of which structure is enclosed within an overhanging canopy 238. The printing structure comprises a frame 239 having parallel vertical slots 240 therein to accommodate guide bolts 241, as clearly shown in Fig. 9.

The frame has a central cam opening 242 therethrough to accommodate a cam 243. This cam is keyed to the meter press drive shaft 177 and is eccentrically mounted thereon, as shown in Fig. 9 of the drawings. The minor radius of the cam is less than the distance from the center of the shaft to the cam plate 244, thus causing the action of the cam to be delayed, for a purpose which is to be hereinafter set forth. The frame structure 230 carries a rubber plating cushion 245 beneath which a metal plate 246 is disposed, and beneath which metal plate the type and frame 247 are carried. In this manner the printing plate and its type will have a yieldable backing, thus insuring satisfactory contact with the surface of the printed matter and a proper printing impression thereon.

The sleeve 237 is rectangular in section and completely encloses the sides of the printing structure. This sleeve is designed to move vertically with relation to the printing structure while providing a guide therefor, and also contacting with the surface of the matter to be printed in advance of the contact of the printing plate therewith. This insures that the rectangular area upon which the impression is to be made will be drawn taut and that the printing structure will accommodate printed matter of varying thickness which will be forced downwardly until the surface of the printed matter is in the proper printing plane.

The sleeve 237 is provided with rectangular cam openings 248 in its ends. These cam openings accommodate a pair of cams 249 keyed upon the shaft 177. The minor axis of these cams is substantially equal to the distance between the center of the shaft and the lower pressure face of the cam openings, thus insuring that the cams 249 will initiate downward movement of the sleeve in advance of downward movement of the printing frame. The ends of the sleeve are slotted as indicated at 250 to receive the guide bolts 241 previously described.

The mail matter to be printed is delivered onto a rubber platen 251. This platen is enclosed within a frame 252 and is supported by a metal backing plate 253. An extending arm 254 extends horizontally from and is formed integral with the meter box. The platen is disposed above said arm and is universally yieldable with relation thereto in a vertical plane.

Guide bolts 255 secure the platen against lateral movement with relation to the arm. Cushion springs 256 circumscribe the guide bolts and are interposed between the arm and the backing plate 253, thus yieldably supporting the platen and making it possible for the platen to recede under pressure of the downwardly moving sleeve 237 until the upper surface of the printed matter is in the printing position.

*Operation*

In operation of the present invention envelopes will be disposed in the stack 13. This structure has been shown in Fig. 5 of the drawings. When the stack is to be filled the lid 97 is swung upwardly in the direction of the arrow "*a*", and as this swings upwardly the finger 99 also raises to permit the catch 102 to fall and stand in the path of travel of the lock member 103. The wedge block 81 may then be moved in the direction of the arrow "*b*" as indicated in Fig. 5, until the catch member 102 engages the lock lug 103. This will hold the member 81 against movement and prevent the pull of the cables 88 and the tension springs 96 from forcefully moving the members 81 to eject the envelopes from the rack. When the rack 13 has been completely filled the weighted arm 104 will swing downwardly against the foremost envelope in the rack and the roller 107 will exert pressure upon it so that the envelopes maintain a feathered position with relation to each other, and will be yieldably held to be ejected therefrom as the machine operates. The envelope feed roller 109 then moves in the direction of the arrow "*c*" in Fig. 5, to cause the foremost envelope in the rack to be moved downwardly and outwardly through throat 108, as indicated by dotted lines in Fig. 5, and to a position where the forward lower edge of the envelope will strike the surface of the metal roller 55. It will be understood that prior to this time the suitable electrical connections have been made with the socket of the machine and that the snap switch 23 has been closed, so that the motor 18 will be continuously rotating. This motor will thus continuously drive the jack shaft 29 and will thus insure that all of the driving pulleys and belts will be in rotation, dependent upon which of the cone clutch members 37 or 38 are in mesh with their respective drum. Under normal conditions the cone clutch member 37 is in mesh with the drum 40, thus causing the pulleys 41, 42 and 43 to be continuously rotating. These pulleys in turn operate through the belts which embrace them to drive the shaft 50 upon which the rubber faced roller 54 and the metal faced roller 55 are mounted. These two rollers rotate in the direction of the arrow "*d*" as indicated in Fig. 3 of the drawings.

When the lower outer edge of the envelope strikes the metal faced roller there will be no particular resistance to the sliding movement of the envelope and the envelope will thus slip outwardly until its upper rear edge has moved through the throat 108 and the envelope will then fall down and lie flat upon the metal roller 55 and the rubber roller 54. The rubber roller will then exert some friction upon the under surface of the envelope to insure that the envelope will be moved through the machine in the direction of the arrow "*e*" indicated in Fig. 3 of the drawings.

It will be understood that the envelopes have been so placed as to insure that the flap will lie beneath the envelope and adjacent the wall 116 so that it will properly register with the moistening unit as will be hereinafter described. The envelopes then move successively forwardly along and over the floor 112, as propelled by the rollers 54 and 55. The envelopes will then encounter roller 117 which will continue the forward feed movement of the envelopes until a small roller 120 is reached. This roll will frictionally engage the under side of the envelope and will tend to force it beneath the flexible gate member 119 carried at the bottom of the end wall 118. The position of the roller 120 is such that it will tend to raise the forward end of the envelope and insure that it will properly enter the throat formed between the rollers 61 and 62. As the envelope advances to this position the body portion of the envelope upon which the flap occurs will be free from any support and the envelope will be secured between the rollers 61 and 62. These rollers are running at a relatively high speed, and will advance the envelope through the moistener station. When the flap portion of the envelope is permitted to advance without support, the flap 128 will tend to spring downwardly and form a throat between it and the body of the envelope, to receive the point 127 of the moistener tube 123. This tube, as previously described, is formed with a plurality of openings along its lower edge, and these openings will apply moisture to the flap of the envelope.

The relative position of the moistener tube 123 to the envelope is more particularly shown in Fig. 13 of the drawings. The travel of the envelope with relation to the moistener tube is shown in three stages of its travel in Figs. 13 to 15 of the drawings.

After the envelope flap has been moistened over the glue area it is carried forwardly until it engages the inclined plate 133 and is lifted upwardly to enter the throat occurring between the rolls 134 and 135, and the conveyor belts 136 and 137. The rolls 134 and 135 will exert pressure upon the envelope as produced by the compression spring 143 in the bearing box 142 of shaft 140. This pressure will tend to force the moistened flap of the envelope against the body surface and will act to seal the envelope.

As the envelope is advanced under action of the conveyor belts 136 and 137, the flap portion of the envelope will again be free due to the fact that it will pass between the rollers 134 and 135 and will pass to the printing press station where it will be disposed above the platen 251. When the forward end of the envelope reaches the trip roller 152, this roller and the lever 154 will swing downwardly in the direction of the arrow "*f*" as indicated particularly in Fig. 12 of the drawings. This downward swinging movement will be resisted by a spring 154'. As the lever 154 swings downwardly it will rotate the trip shaft 157 which will swing the lever 158 in the direction of the arrow "*g*" as indicated in Fig. 12 of the drawings. This action will cause the shuttle 160 to move transversely of the end of the cam 168 in the direction of the arrow "*h*" as shown in Fig. 12 of the drawings. The shoulder 165 on the shuttle 160 will thus force against the pin 162 carried by the shuttle block 166. This will move the shuttle block in the direction of the arrow "*h*" and will cause the block to move from a supporting position beneath the cam pin 167. During this time the belt 169 provided to drive pulley 170 has been under continuous driving tension. This has been caused by frictional engagement of the metal washer 65 upon the jack shaft 29 with a leather washer 64 carried by the clutch drum 63 of the shuttle block 166 forming an obstructing position with relation to the pin 167 and releasing the cam 168 and permitting it to instantly begin rotation in the direction of the arrow "*i*" as shown in Fig. 12 of the drawings.

As the shuttle 160 and the shuttle block 166 continue to move transversely of the cam 168, the lower corner 163 of the shuttle 160 will travel upwardly and outwardly along the wedge block 164, and against the compression of a spring 164'. As this travel continues, the shoulder 165 of the shuttle 160 will move upwardly along the flat face of the pin 162, until the pin registers with the slot 161, at which time the spring 164' will return the shuttle block 166 to its obstructing position. This return movement will not, however, be effected until the pin 167 has traveled beneath and beyond the shuttle block 166 as the cam 168 rotates. This insures that but one rotation of the cam will take place at each actuation of the trip mechanism. The instant the cam 168 rotates in the direction of the arrow "*i*" as shown in Fig. 12, the dwell 170 of the cam will move from a supporting position beneath the point of the trip finger 171 carried by the clutch arm 39, and spring 79 will thus be free to swing the clutch arm 39 so that the clutch cone 37 will move out of driving contact with the clutch drum 40, and the clutch cone 38 will move into frictional contact with the clutch drum 63. This will simultaneously discontinue the operation of any of the envelope feed and moistener mechanism, and establish a driving relation between the jack shaft 29 and the printing press drive shaft 177, through the pulleys 28 and 70, and the belt 69.

It will be understood that the printing press has been previously set so that the dials 192 indicate the number of authorized printing impressions which may be made under permit arrangements.

The printing press normally stands with its printing plate 121 completely covered by the ink pad structure 220, and with the pad bearing firmly against the printing face of the plate. This will prevent impressions from being made without complete normal actuation of the printing press. The ink pad and its frame are immovably held in this guarding position due to the fact that the flange 223 on the cam 219 normally stands to obstruct swinging movement of the finger 224, and the operating lever 226; thus, until the cam 219 is rotated the ink pad will be immovable and cannot be forced inwardly or wedged downwardly.

The entire printing head, as previously described, is enclosed within the canopy 238, and can only be partially observed with difficulty.

When the shaft 177 is rotated in the direction of the arrow "*j*", as seen in Fig. 8 of the drawings, the cams 249 will swing downwardly and will move sleeve 237. After the sleeve has moved downwardly a predetermined distance, the cam 243 will act against the face 244 of the frame structure 239 and will move the printing head downwardly.

It will be observed by reference to Fig. 9 of the drawings that the lower edge of the sleeve 237 is level in a longitudinal plane and that it will bear directly upon and flush against the upper face of the article of mail matter to be printed.

In view of the fact that the articles of mail matter may vary in thickness with relation to each other and may lack uniformity in thickness throughout their length and breadth, it is necessary to move the article downwardly until the surface upon which the printing impression is to be made is in a printing plane, while the material of the surface is being held taut by the square end of the sleeve 237. As the guide sleeve is pressing downwardly upon the article of mail matter it will in turn compress the springs 256 and cause the piston 251 to assume a supporting position beneath the article of mail matter to permit the surface upon which the printing impression is to be made to lie parallel to the printing plane, irespective of the general thickness of the article of mail matter, or of variation in thickness at different points in its length or breadth.

Prior to initial movement of the sleeve 237 which forms a guide for the printing head, the cam 219 will rapidly act upon the finger 224 to swing the arm 226 rearwardly and rapidly retract the ink pad structure 220 from its guarding position beneath the type plate or die. The sleeve will immediately move downwardly as this operation takes place and will thus tend to encompass the printing die with a guard wall as the lower edge of the sleeve moves into contact with the article of mail matter, and it will be evident that when the sleeve is thus in contact with the article of mail matter, the printing die 221 will be inaccessible. As the shaft 177 continues to rotate, the cam 243 will act upon the printing frame structure to move the printing die 221 downwardly into contact with the face of the piece of mail matter upon which an impression is to be made. After the cam 243 has rotated half a revolution it will act to raise the printing frame 239 and will then draw the printing die 221 upwardly within the bottom of the sleeve 237. The sleeve 237 will then raise to its concealed position simultaneously with the outward projection of the ink pad structure 220, which due to the pawl member 234 will cause the ink pad structure 220 to have a downward and outward dipping movement to clear the end of the sleeve and to strike the face of the type with some force in inking the same, during which the pad will follow the sleeve upwardly until it abuts with its face against the face of the printing die 221, where it will be again locked and held by the flange 223 on the cam 219. When this action takes place the counter-dials of sets 191 and 192 will both be operated, one to add a unit on the dials 191 and the other to subtract a unit from the dials 192. When the dials 192 have been actuated until they all appear at zero, the cams 257, one of which is associated with each of the dials of set 192 will move until a recess 258 is in register with the end of a finger 259. These fingers, as shown in Fig. 8 of the drawings, are united to a common lever structure 260 pivoted by its opposite ends at 261 and 262. The lever structure 260 carries the lock pawl 198 and the extension finger 201, and when all of the dials of bank 191 are at zero, the lever 260 will swing in the direction of the arrow "*k*" as indicated in Fig. 10 of the drawings, so that the lock pawl 198 will stand in an obstructing position with relation to the lock lug 199 keyed upon drive shaft 177 of the meter press. This will prevent rotation of the printing press in an advance direction, and the pawl 214 will prevent rotation of the shaft 177 in a reverse direction. As the pawl 198 swings downwardly, the finger 201 will swing upwardly. This will relieve pressure upon switch post 202 which extends downwardly through the floor of the meter box 178 and into the lock switch 203.

A spring 263 within the printing press box will raise the switch rod 202 moving it from an actuating position with relation to the switch mechanism whereby the flow of electric current through the machine will be interrupted, and cannot be again established until after the printing press unit has been set by postal authorities, and the lower end of the switch rod 202 again projected through the floor of the printing press box 178.

In the event that the number of available impressions of the printing press has been exhausted, as previously described, or in the event it is desired to remove one printing press box making impressions of one denomination, and applying a printing press box making impressions of other denominations; as, for example, impressions in lieu of two cent stamps and four cent stamps, respectively, the fastening member 188 may be manipulated to move to a non-obstructing position with relation to the legs 184 of the printing press units, thus permitting the entire printing press unit to be bodily removed and interchanged with other meter press units, or to be carried to the suitable postal authority for resetting.

When proper settlement has been made, a postal authority may break the seal on the printing press unit and swing the lid 108 upwardly; at the same time this action will operate through the extension lug 211 to move the pitman rod 210 and swing the rocker arm 208 outwardly in the direction of the arrow "$l$" as shown in Fig. 10 of the drawings. This will swing the pinions 206 free with relation to the dial gears 205 and will permit the dials of bank 192 to be manipulated and set for a desired number of impressions. At the time the dials are set, the fingers 259 of lever 260 will be raised due to the fact that the came 257 will in some instances be moved to support the finger 259 and thus hold the lock pawl 198 in an outwardly and non-obstructing position with relation to lock lug 199, at the same time acting through the finger 201 to force the switch rod 202 downwardly and to project its lower end downwardly through the floor of the printing press so that it may enter the switch structure 203 and establish an electric circuit for the operation of the postal machine.

When the printing press is again placed properly upon the frame of the postal machine and locked into position with the lock structure 188, the machine is then ready for operation until such time as the bank of dials 191 again all move to zero.

In Figs. 2 and 2a, the postal machine is shown mounted within a cabinet. This cabinet includes a table structure 265, carrying a superposed cabinet unit 266. This unit houses a number of compartments 267 into which mail classified as to denomination of postage may be separately placed prior to mailing, and which compartments are accessible when the cabinet is open. Certain of these compartments may also be used for storage of the various meter units when they are not attached to the machine.

The cabinet structure includes a pair of swinging ends 268 which may swing outwardly to permit free access to the postal machine, and which, when swung inwardly provide guideways for a roller top cover 269, shown in Fig. 2a as being closed.

A pair of baskets 270 and 271 are detachably secured at opposite ends of the table when the machine is in operation, and may be used to receive the mail matter prior to feeding into the machine, and after it is discharged from the machine. The baskets are of such dimensions as to permit them to nest, one within the other when not in use, and to be placed within the cabinet at the left end of the postal machine. This places these baskets in a position to receive mail matter which may be passed into the cabinet through the letter drop 272.

It will be understood that while the present application discloses a moistening, sealing and cancelling machine and a printing press operating in coordination, that it may be found desirable under some circumstances to interrupt any one or more of the operations, independently of each other, and this may be done without departing from the spirit of the present invention.

An analysis of the postal machine here shown discloses the fact that a simple base unit is provided, carrying a letter feeding and sealing mechanism operating in conjunction with the printing press; said sealing mechanism incorporating novel moistening means and the printing press being so designed as to prevent tampering or the making of printing impressions in an unauthorized or surreptitious manner; the entire structure operating automatically and continuously to feed, moisten, seal and print articles of mail matter within the contemplation of the postal act.

While I have shown the preferred form of my invention as now known to me, it will be understod that various changes may be made in the combination, construction and arrangement of parts by those skilled in the art, without departing from the spirit of the invention as claimed.

Having thus described my invention, what

I claim and desire to secure by Letters Patent is:

1. An envelope rack comprising a floor, a vertical endless wall at one end of said floor, an inclined block adapted to move transversely of the floor and longitudinally of the end wall, means for causing movement of said block to feed envelopes lengthwise of the floor, a feed roller disposed at the opposite end of the floor from the inclined block and acting with the end of the floor to form a throat through which envelopes may singly and successively pass as the feed roller rotates, and a pressure roller rotating in a reverse direction from the feed roller and acting against the envelopes disposed within the rack whereby the envelopes will be held in an inclined position with their lower edges feathered and the foremost envelope only will be withdrawn by the feed roller.

2. An envelope rack comprising a floor, a vertical endless wall at one end of said floor, an inclined block adapted to move transversely of the floor and longitudinally of the end wall, means for causing movement of said block to feed envelopes lengthwise of the floor, a feed roller disposed at the opposite end of the floor from the inclined block and acting with the end of the floor to form a throat through which envelopes may singly and successively pass as the feed roller rotates, a second roller resting against the foremost envelope in the rack and rotating in a reverse direction to that of said feed roller whereby the envelopes will be held in their inclined position with their lower edges feathered and the feed roller will only feed the foremost envelope at a time, and a cover disposed over the top of the rack and parallel to the floor thereof to prevent envelopes from becoming displaced due to the feed action of the inclined block.

3. In a structure of the character described an envelope rack, a feed block adapted to move longitudinally thereof under constant force, a cover for said rack pivoted at one end thereof, means for locking the said block in an inoperative position when the cover is raised and means for automatically releasing the feed block when the cover moves to its closing position.

4. In a postal machine, an envelope conveying structure adapted to receive envelopes delivered in a path inclined to the plane of the conveyor after which the envelopes will slide outwardly and lie flat upon the conveyor, said conveyor structure comprising a roller having its outer longitudinal section formed with a nonfriction surface to permit outward sliding of the envelopes and its inner longitudinal section formed with a frictional surface to engage the envelopes and advance them in the conveying plane, and a side board extending upwardly along the outer edge of the envelope conveying plane and adapted to limit the outward sliding movement of the envelopes as they move to a horizontal position.

5. In a postal machine, an envelope conveying structure adapted to receive envelopes delivered in a path inclined to the plane of the conveyor after which the envelopes will slide outwardly and lie flat upon the conveyor, said conveyor structure comprising a roller having its outer longitudinal section formed with a nonfriction surface to permit outward sliding of the envelopes and its inner longitudinal section formed with a frictional surface to engage the envelopes and advance them in the conveying plane, a side board extending upwardly along the outer edge of the envelope conveying plane and adapted to limit the outward sliding movement of the envelopes as they move to a horizontal position, and means for supporting said side board for lateral adjustment whereby to accommodate envelopes of various dimensions.

RALPH G. WHITLOCK.